United States Patent [19]
Gras et al.

[11] Patent Number: 5,502,942
[45] Date of Patent: Apr. 2, 1996

[54] PANEL FASTENER

[75] Inventors: Jeffrey D. Gras, Zeeland; Lee Garvelink, Holland, both of Mich.

[73] Assignee: Prince Corporation, Holland, Mich.

[21] Appl. No.: 122,895

[22] Filed: Sep. 16, 1993

[51] Int. Cl.⁶ .................................................... E04B 1/38
[52] U.S. Cl. ................. 52/511; 52/512; 52/715; 411/467; 24/295
[58] Field of Search .............................. 52/715, 578, 579, 52/582, 584, 587, 474, 811, 511, 512; 24/295; 411/467, 468, 463

[56] References Cited

U.S. PATENT DOCUMENTS

| | | | |
|---|---|---|---|
| 2,311,410 | 2/1943 | Meyer | 24/295 X |
| 2,500,377 | 3/1950 | Poupitch | 24/295 |
| 2,533,786 | 12/1950 | Gagnier | 52/511 |
| 2,644,213 | 7/1953 | Bedford, Jr. | 24/295 |
| 3,491,820 | 1/1970 | Ostling | |

FOREIGN PATENT DOCUMENTS 930039  7/1947  France ................................. 411/467

*Primary Examiner*—Creighton Smith
*Attorney, Agent, or Firm*—Price, Heneveld, Cooper, DeWitt & Litton

[57] ABSTRACT

A fastener for securing panels together has a body made of spring steel member having a rosette fastener and at least one mounting flange. The rosette fastener is secured within a first polymeric panel with the mounting flange engaging the opposite surface of an abutting substrate panel for lockably engaging the substrate and panel thereby holding the two panels together. In a preferred embodiment of the invention, the fastener includes a pair of flanges which are offset from a central platform of the body in which the rosette fastener is formed.

10 Claims, 3 Drawing Sheets

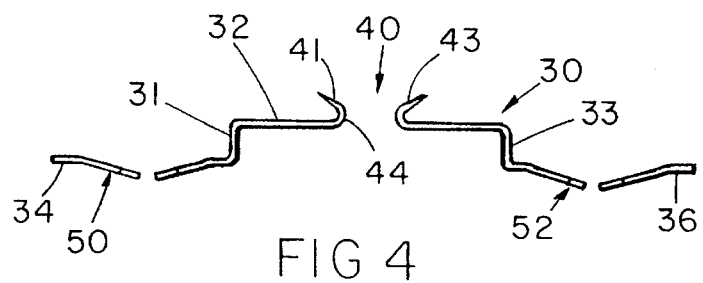
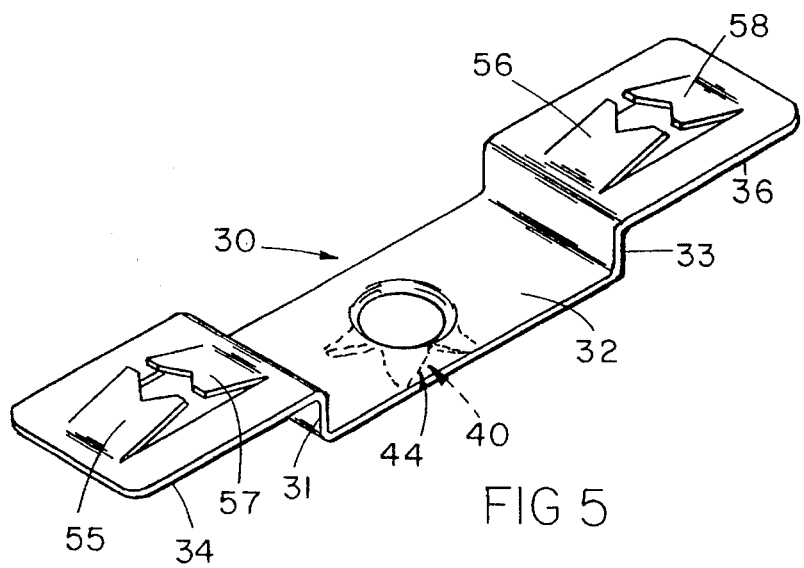
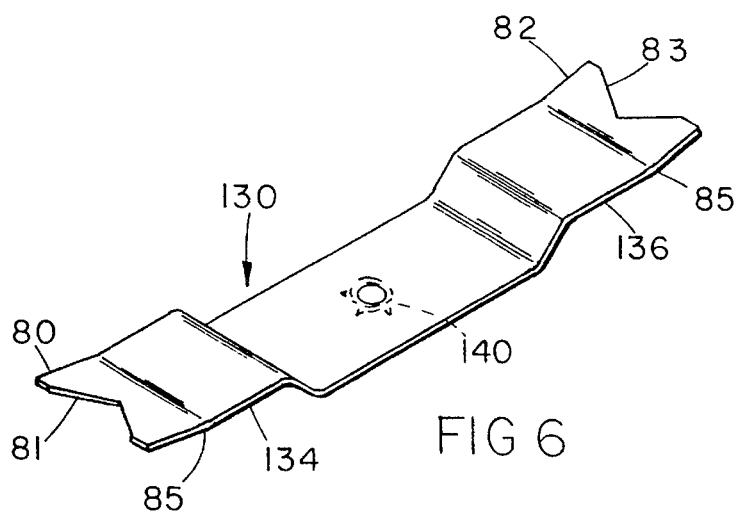

PANEL FASTENER

BACKGROUND OF THE INVENTION

The present invention pertains to fasteners employed for attaching a decorative vehicle panel to a planer substrate and particularly where the panel and substrate are made of polymeric materials.

Panels such as vehicle door panels in the past have been made of a fiberboard material and include snap-in fasteners which extend into the sheet metal of the corresponding door. Other hook-like releasable connectors have also been proposed such as disclosed in U.S. Pat. No. 5,233,731 issued Aug. 10, 1993 and assigned to the present Assignee. Other so-called Christmas-tree type fasteners have also been employed for attaching panels to the underlying substrate. More recently vehicles have included decorative outer panels made of a polymeric material such as ABS which is attached to an underlying support panel made of polypropelene. When attaching these relatively thin polymeric panels together, conventional fasteners cannot easily be permanently anchored to either of the panels and heat-stake bosses frequently used for joining polymeric panels do not result in sufficient pull strength to pass standards required by the industry because they would have to be too small to avoid sinks. Accordingly, there is a need for a fastening device for coupling a pair of generally planer panels together which meets the strength requirements of the automotive industry and yet, is relatively inexpensive. The fastener must be used for attaching a decorative outer panel to a supporting substrate and aesthetically attaches to the decorative panel and yet firmly anchor the decorative panel to the supporting substrate.

SUMMARY OF THE INVENTION

The fastener of the present invention provides these desired goals by utilizing a spring steel body having a rosette fastening means extending outwardly from one side of the body. The fastener also includes at least one flange which includes means for gripping a mounting post. The rosette fastener is secured within a first polymeric panel with the flange means engaging an opposite surface of the abutting substrate for lockably engaging the substrate panel thereby holding the two panels together. In a preferred embodiment of the invention, the fastener body includes a central section in which the rosette is formed and a pair of offset flanges extending from opposite sides of the central section. The flanges include means for securing the fastener to the substrate panel and subsequently, the rosette fastener is embedded into the decorative panel for securing the panels together. The resulting structure provides an improved and yet, relatively inexpensive fastener which has a high holding strength and which can be successfully employed for coupling two panels of dissimilar polymeric materials such as a polypropelene substrate with an ABS decorative panel. These and other features, objects and advantages of the present invention will become apparent upon reading the following description thereof together with reference to the accompanying drawings in which:

BRIEF DESCRIPTION OF THE DRAWINGS

FIG. 4 is a front elevational view of the fastener shown in FIG. 3;

FIG. 5 is a perspective view of the fastener shown in FIGS. 1–4;

FIG. 6 is a perspective view of an alternative embodiment of the fastener of the present invention;

DETAILED DESCRIPTION OF THE PREFERRED EMBODIMENT

Figure 1:
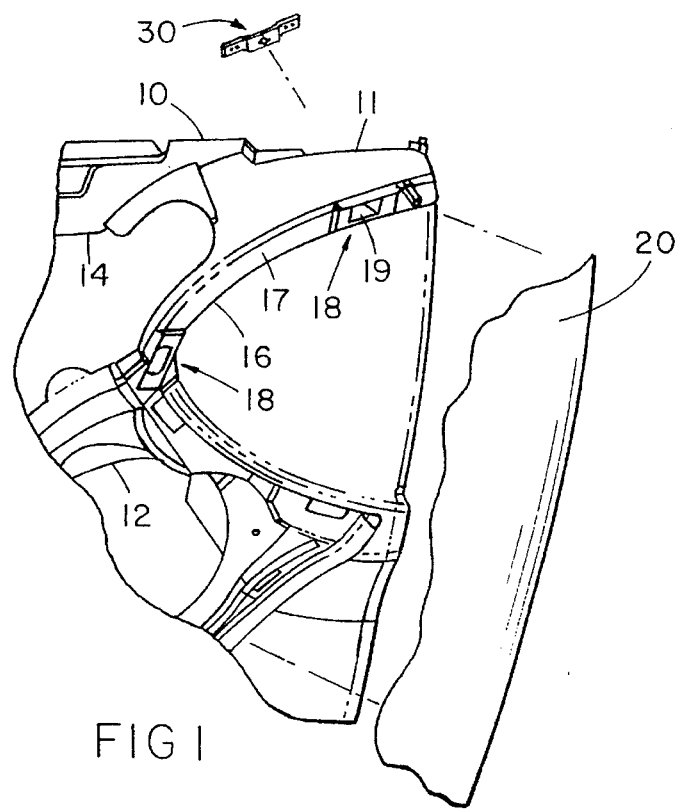
FIG. 1 is a fragmentary, exploded perspective view of a portion of a pair of vehicle door panels and a fastener embodying the present invention.

Referring initially to FIG. 1, there is shown a portion of an underlying substrate which is a polypropelene inner door panel 10 for a vehicle such as an automobile. Panel 10 is molded of a polypropelene material and includes a configuration for receiving an variety of vehicle accessories such as a loudspeaker opening 12, an armrest mounting opening 14, and an opening 16 for conforming the front of the door panel to the instrument panel when the door is closed. At various locations on panel 10 there are spaced mounting recesses 18 for attaching a decorative panel 20 to the underlying support panel 10. Panel 20 faces the interior of the vehicle once installed. Each of the mounting recesses 18 include a generally rectangular opening 19 through which an offset center area 32 of a fastener 30 embodying the present invention extends as described below in connection with FIG. 2 for attaching panel 20 to panel 10. In the preferred embodiment, panel 10 is integrally molded of a polymeric material such as polypropelene while panel 20 is molded of an ABS material textured and colored to provided an aesthetic appearance and final trim for the vehicle door. Thus, panel 20 is secured to panel 10 by a plurality of fasteners 30 each of which extend from the rear surface 11 (FIG. 2) of substrate panel 10 toward and fastened to panel 20.

Figure 3:
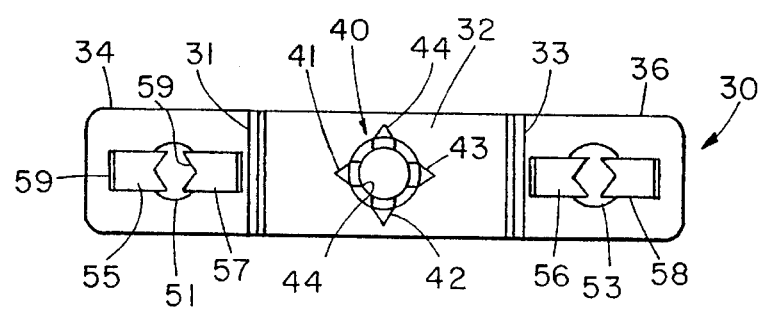
FIG. 3 is an enlarged, top plan view of the fastener shown in FIGS. 1 and 2.

Fastener 30 is made of SAE 1070 spring steel and is stamped from material having a thickness of approximately 0.015 inches and finished with a zinc-black finish for protecting the spring steel member from the corrosive automotive environment. Fastener 30 is best seen in FIGS. 3–5 and, in the preferred embodiment, comprises a somewhat U-shaped member having a central raised area 32 which as best seen in FIG. 4, is offset by vertically extending legs 31 and 33 from a pair of outwardly extending mounting flanges 34 and 36.

Figure 2:
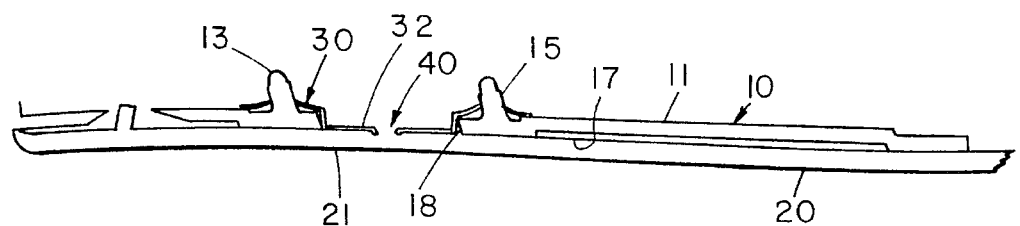
FIG. 2 is an enlarged, fragmentary cross-sectional view of the assembled panel shown in FIG. 1 taken through one of the fasteners embodying the present invention.

Centered within the raised platform or central area 32 is fastening means 40 comprising a stamped rosette fastener having four equally spaced sharpened, triangular legs 41–44 extending upwardly and outwardly at 90" intervals around a central generally circular opening 44. The diameter of aperture 44 is approximately 3.8 millimeters while the diameter of the rosette fastener from the tip of one finger 41 to the tip of an opposite finger 43 is 8 millimeters. Each of the tips 41–44 are generally triangular and are inclined upwardly as best seen in FIG. 4 at an acute angle of approximately 40° to the plane of the central section. Formed in each of the flanges 34 and 36 are post-gripping means 50 and 52 respectively (FIG. 4), each of which include a generally circular aperture 51 and 53 spanned on opposite sides by downwardly inclined gripping legs 55 and 57 with respect to aperture 51 and 56 and 58 with respect to aperture 53 as best seen in FIG. 3. Each of the opposed, facing legs includes a V-shaped notch 59 formed therein for gripping, as best seen in FIG. 2, cylindrical posts 13 and 15 extending outwardly from the rear surface 11 of substrate panel 10 with the V-shaped notches 59 digging into and lockably engaging the posts for securing fastener 30 to the rear surface of panel 10 with the central mounting area 32 being substantially flush with the front mounting surface 17 (FIG. 1) of panel 10. Each of the fasteners 30 are formed by a conventional stamping process.

During assembly of the panels, a fastener 30 is first attached by press fitting within the mounting recesses 18 of the underlying substrate panel 10 and the decorative panel 20 is held in place adjacent to and aligned with the underlying support panel 10. A heat-staking tool is positioned in centered alignment with each of the fastening rosettes 40 and energy applied from the side of panel 10 for heating the rosette and its tips 41–44 and fusing them into a small now melted area of panel 20 while applying pressure. Subsequently, the heat is removed and the part cooled to bond the rosette fastening means 40 substantially mid-way through the ABS decorative panel 20 as seen in FIG. 2. The heat-stake process is substantially conventional and deflects the fastener central area 32 into engagement with panel 20 for providing in connection with spring legs 34 and 36 a tension force urging panels 10 and 20 together. The rosette 40 securely locks fastener 30 to panel 20 while providing an undetectable smooth finish 21 in the area opposite rosette 40 (FIG. 2) such that the decorative panel is firmly and permanently attached to the underlying support panel 10.

Figure 7:
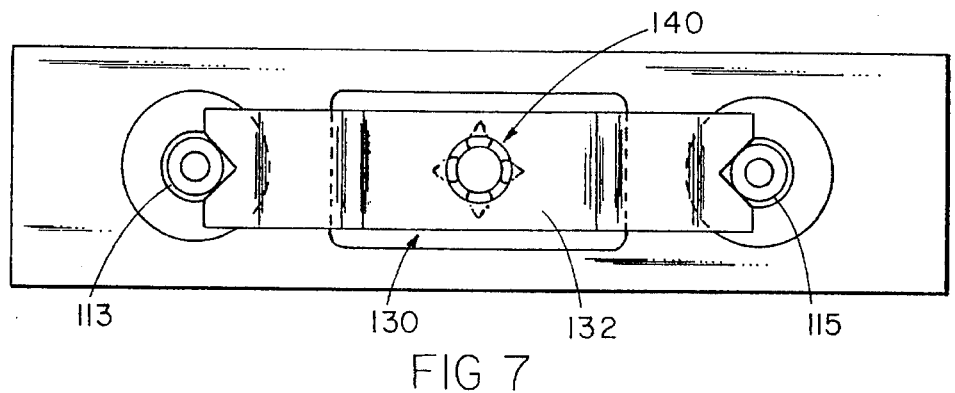
FIG. 7 is a bottom plan view of the fastener shown in FIG. 6 shown attached to an underlying substrate.
Figure 8:
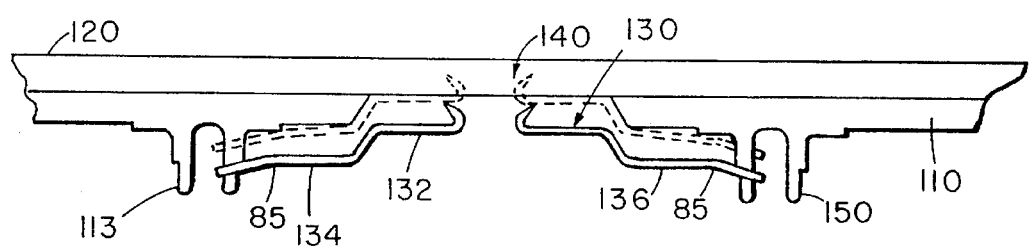
FIG. 8 is a side elevational view of the structure shown in FIG. 7 shown in phantom in its final assembled position secured to a decorative panel.

An alternative embodiment of the panel fastening clip is shown in FIGS. 6–8 in which similar fastener components are identified by the same reference numerals as the first embodiment but are preceded by the reference numeral 1. Thus, in FIGS. 6–8, a panel fastening clip 130 is shown with a raised center section 132 having a rosette fastener 140 of the same design as rosette 40 in the preceding embodiment. Fastener 130 includes legs 134 and 136 with upwardly turned ends 80 and 82 respectively. The legs have outer ends with inwardly formed V-shaped notches 81 and 83 for engaging, as best seen in FIGS. 7 and 8, the inner facing peripheral surfaces of spaced cylindrical mounting posts 113 and 115 of a substrate panel 110. The rosette fastener 140 is embedded in a decorative panel 120 in the same manner as discussed in the previous embodiment. Thus, in the embodiment shown in FIGS. 6–8, the apertures 51 and 53 are replaced with notches which are spaced in tight engagement as best seen in FIG. 8 to frictionally engage and dig into the inner facing edges of posts 113 and 115 for locking the fastener 130 to panel 110 that is subsequently mounted to decorative cover 120 by the heat-staking process previously described. By dimensioning notches 81 and 83 such that the spacing from their apexes is less than the spacing between the closest points between posts 113 and 115, and by upwardly inclining the tips 80 and 82 at bends 85 as best seen in FIGS. 6 and 8, the fastener 130 can be easily wedged into a locking position between posts 113 and 115.

Figure 9:
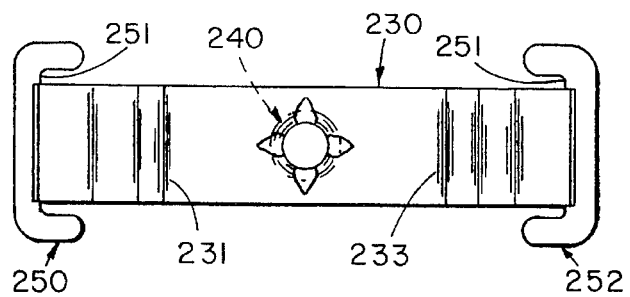
FIG. 9 is a bottom plan view of yet another embodiment of the present invention shown attached to an underlying substrate.
Figure 10:
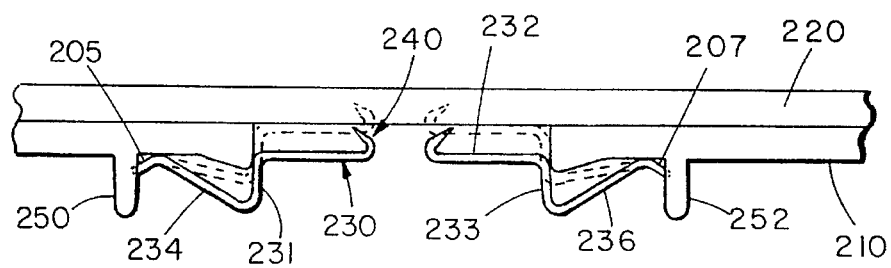
FIG. 10 is a side elevational view of the structure shown in FIG. 9 shown in phantom form in its final installed position secured to a decorative panel.

A third embodiment of the invention is shown in FIGS. 9 and 10 by which a fastener 230 is shown, again with parts similar to that of the first embodiment having similar reference numerals as that of the first embodiment, but preceded by reference numeral 2. Fastener 230 also includes a rosette fastening means 240 in a raised central platform 232 and includes downwardly depending legs 231 and 233 extending from opposite sides of central plane 232 and terminating in upwardly inclined legs 234 and 236. Legs 234 and 236 include a downwardly depending tips 205 and 207 respectively. The spacing between these tips is slightly less than the spacing between a pair of upstanding, generally U-shaped shoulders 250 and 252 formed on the outside of panel 210 with the shoulders having inner facing edges 251 spaced a distance apart less than the spacing between tips 205 and 207 of legs 234 and 236 respectively such that the fastener 230 can be wedged between the generally U-shaped shoulders 250 and 252 for securing the fastener to a backing support panel 210. After the fastener 230 is mounted to panel 210, the integrally formed rosette fastener 240 is heat-staked to a decorative panel 220 in the same manner as discussed with reference to the first embodiment of FIGS. 1–5.

Thus, for securing panel 210 to decorative panel 220, the spring steel fastening member 230 is forced fitted and wedged into the space between shoulders 250 and 252 with the tips 205 and 207 digging into the inner surfaces 251 of the shoulders locking the spring clip in place with respect to panel 210. Subsequently, the rosette 240 is heat-stake welded into the decorative panel 220 as previously described. As can be appreciated, particularly as illustrated in FIGS. 8 and 10, the spring steel fasteners 30, 130 and 230 are under spring tension drawing decorative panels 20, 120 or 220 into abutting compressive relationship with support panels 10, 110 and 210 respectively. The spring steel construction of the clip-type fasteners thus not only hold the panels together, but provide a substantial pulling force, urging the panels in abutting relationship due to the deflection of legs 34, 36, 134, 136, 234, and 236 of the respective fasteners as they are moved from a static position mounted to the respective support panels into a deflect position in which they are heat-staked into the decorative panel into which the rosette fastener is subsequently fused while the clip remains in its deflected position, thus urging the decorative panel against the support panel. It will become apparent to those skilled in the art that various modifications to the preferred embodiment of the invention can be made without departing from the spirit or scope of the invention as defined by the appended claims.

The embodiments of the invention in which an exclusive property or privilege is claimed are defined as follows:

1. A one piece fastener comprising;

an elongated spring steel body having a single centrally positioned rosette fastening means formed therein and including a plurality of spaced outwardly projecting generally triangular projections for embedding into a polymeric member for attaching said fastener to a polymeric member, said body further including a pair of frictional gripping members extending from opposite sides of said rosette fastening means for coupling said body to a second member wherein said body includes a pair of flanges extending from opposite sides of said rosette fastening means, and wherein said gripping members are formed in said flanges, wherein said body includes a central section in which said rosette fastening means is formed and a pair of legs coupling said flanges to said central section for offsetting said flanges from said central section.

2. A fastener for attaching a pair of panels together in generally parallel planes and in abutting relationship comprising:

a spring steel body having a central section having rosette fastening means including a plurality of spaced generally triangular projections formed in said central section extending outwardly in a first direction, said body further including at least one flange offset from said rosette fastening means for coupling said body to a first one of a pair of panels with said rosette fastening means positioned to engage a second one of a pair of panels, wherein said fastener includes a pair of flanges extending from opposite sides of said rosette fastening means and a pair of legs coupling said flanges to said central section for offsetting said flanges from said central section, wherein each of said flanges include an aperture and at least one locking leg positioned adjacent said aperture for attaching said flange to a post on a first one of a pair of panels.

3. A fastener for attaching a pair of panels together in generally parallel planes and in abutting relationship comprising:

a spring steel body having a central section having rosette fastening means including a plurality of spaced generally triangular projections formed in said central section extending outwardly in a first direction, said body further including at least one flange offset from said rosette fastening means for coupling said body to a first one of a pair of panels with said rosette fastening means positioned to engage a second one of a pair of panels, wherein said fastener includes a pair of flanges extending from opposite sides of said rosette fastening means and a pair of legs coupling said flanges to said central section for offsetting said flanges from said central section, wherein each of said flanges include notch means formed in the ends of each of said flanges for engaging posts on a first one of a pair of panels.

4. A fastener for attaching a pair of panels together in generally parallel planes and in abutting relationship comprising:

a spring steel body having a central section having rosette fastening means including a plurality of spaced generally triangular projections formed in said central section extending outwardly in a first direction, said body further including at least one flange offset from said rosette fastening means for coupling said body to a first one of a pair of panels with said rosette fastening means positioned to engage a second one of a pair of panels, wherein said fastener includes a pair of flanges extending from opposite sides of said rosette fastening means and a pair of legs coupling said flanges to said central section for offsetting said flanges from said central section, wherein each of said flanges include upwardly turned ends formed on said flanges for engaging spaced walls on a first one of a pair of panels.

5. A fastener for attaching a pair of panels together in generally parallel planes and in abutting relationship comprising:

a generally U-shaped spring steel body having a central section with rosette fastening means formed therein and extending outwardly in a first direction, wherein said rosette fastening means includes a plurality of spaced outwardly projecting generally triangular projections, said body further including a pair of mounting flanges for coupling said body to a first one of a pair of panels with said rosette fastening means positioned to engage a second one of a pair of panels, wherein each of said flanges include means for attaching said fastener to one of a pair of panels with said rosette fastening means extending toward another one of a pair of panels, wherein said attaching means comprises an aperture formed in each of said flanges and at least one locking leg positioned adjacent said aperture for attaching said flange to a post on a first one of a pair of panels.

6. A fastener for attaching a pair of panels together in generally parallel planes and in abutting relationship comprising:

a generally U-shaped spring steel body having a central section with rosette fastening means formed therein and extending outwardly in a first direction, wherein said rosette fastening means includes a plurality of spaced outwardly projecting generally triangular projections, said body further including a pair of mounting flanges for coupling said body to a first one of a pair of panels with said rosette fastening means positioned to engage a second one of a pair of panels, wherein each of said flanges include means for attaching said fastener to one of a pair of panels with said rosette fastening means extending toward another one of a pair of panels, wherein said attaching means comprises notch means formed in the ends of each of said flanges for engaging posts on a first one of a pair of panels.

7. A fastener for attaching a pair of panels together in generally parallel planes and in abutting relationship comprising:

a generally U-shaped spring steel body having a central section with rosette fastening means formed therein and extending outwardly in a first direction, wherein said rosette fastening means includes a plurality of spaced outwardly projecting generally triangular projections, said body further including a pair of mounting flanges for coupling said body to a first one of a pair of panels with said rosette fastening means positioned to engage a second one of a pair of panels, wherein each of said flanges include means for attaching said fastener to one of a pair of panels with said rosette fastening means extending toward another one of a pair of panels, wherein said attaching means comprises upwardly turned ends formed on said flanges for engaging spaced walls on a first one of a pair of panels.

8. A fastener system for securing a pair of panels together in generally parallel planes and in abutting relationship comprising:

a first polymeric panel defining a substrate to which a second panel is to be mounted, said first panel including at least one recess for receiving a fastener;

a second polymeric panel defining a decorative panel for covering said substrate; and a fastener for attaching said decorative panel to said substrate comprising a generally U-shaped spring steel body having a central section with rosette fastening means formed therein, wherein said rosette fastening means includes a plurality of spaced outwardly projecting generally triangular projections extending through said recess in said substrate and into said decorative panel on a side thereof facing said substrate, said body further including a pair of mounting flanges extending to engage a side of said substrate opposite said decorative panel, wherein each of said flanges include means for attaching said fastener to said side of said substrate and, wherein said attaching means comprises an aperture formed in each of said flanges and at least one locking leg positioned adjacent said aperture for attaching said flange to a corresponding post on said side of said substrate.

9. A fastener system for securing a pair of panels together in generally parallel planes and in abutting relationship comprising:

a first polymeric panel defining a substrate to which a second panel is to be mounted, said first panel including at least one recess for receiving a fastener;

a second polymeric panel defining a decorative panel for covering said substrate; and a fastener for attaching said decorative panel to said substrate comprising a generally U-shaped spring steel body having a central section with rosette fastening means formed therein, wherein said rosette fastening means includes a plurality of spaced outwardly projecting generally triangular projections extending through said recess in said substrate and into said decorative panel on a side thereof facing said substrate, said body further including a pair of mounting flanges extending to engage a side of said substrate opposite said decorative panel, wherein each of said flanges include means for attaching said fastener to said side of said substrate and, wherein said attaching means comprises notch means formed in the ends of each of said flanges for engaging posts on said side of said substrate.

10. A fastener system for securing a pair of panels together in generally parallel planes and in abutting relationship comprising:

a first polymeric panel defining a substrate to which a second panel is to be mounted, said first panel including at least one recess for receiving a fastener;

a second polymeric panel defining a decorative panel for covering said substrate; and a fastener for attaching said decorative panel to said substrate comprising a generally U-shaped spring steel body having a central section with rosette fastening means formed therein, wherein said rosette fastening means includes a plurality of spaced outwardly projecting generally triangular projections extending through said recess in said substrate and into said decorative panel on a side thereof facing said substrate, said body further including a pair of mounting flanges extending to engage a side of said substrate opposite said decorative panel, wherein each of said flanges include means for attaching said fastener to said side of said substrate and, wherein said attaching means comprises upwardly turned ends formed on said flanges for engaging spaced walls on said side of said substrate.

* * * * *

UNITED STATES PATENT AND TRADEMARK OFFICE
CERTIFICATE OF CORRECTION

PATENT NO. : 5,502,942
DATED : April 2, 1996
INVENTOR : Gras et al.

It is certified that error appears in the above-identified patent and that said Letters Patent is hereby corrected as shown below:

Column 2, line 65;

"90"" should be --90°--.

Column 4, line 51;

";" should be --:--.

Signed and Sealed this

Ninth Day of July, 1996

Attest:

BRUCE LEHMAN

Attesting Officer  Commissioner of Patents and Trademarks